United States Patent
Makiuchi et al.

(10) Patent No.: US 8,526,013 B2
(45) Date of Patent: Sep. 3, 2013

(54) BATTERLESS ABSOLUTE ENCODER

(75) Inventors: Kazuhiro Makiuchi, Nagano (JP);
Tomohito Yamazaki, Nagano (JP);
Tooru Miyajima, Nagano (JP);
Shigeharu Katou, Nagano (JP);
Toshiaki Ayuzawa, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 417 days.

(21) Appl. No.: 12/934,456

(22) PCT Filed: Mar. 16, 2009

(86) PCT No.: PCT/JP2009/055068
§ 371 (c)(1),
(2), (4) Date: Sep. 24, 2010

(87) PCT Pub. No.: WO2009/119371
PCT Pub. Date: Oct. 1, 2009

(65) Prior Publication Data
US 2011/0026040 A1    Feb. 3, 2011

(30) Foreign Application Priority Data

Mar. 25, 2008   (JP) ................. 2008-078030

(51) Int. Cl.
*G01B 11/14* (2006.01)
(52) U.S. Cl.
USPC ......................................... 356/614; 356/622
(58) Field of Classification Search
USPC .................. 356/614–624; 33/1 PT, 1 N, 534, 33/501.7, 707, 706, 708; 901/9, 25; 475/162, 475/176; 74/640
See application file for complete search history.

(56) References Cited

U.S. PATENT DOCUMENTS
5,930,905 A    8/1999   Zabler

FOREIGN PATENT DOCUMENTS

| CN | 1175999 A | 3/1998 |
|---|---|---|
| JP | 61-004918 | 1/1986 |
| JP | 63-235812 | 9/1988 |
| JP | 08-178693 | 7/1996 |
| JP | 11-500828 A | 1/1999 |
| JP | 2000-081910 | 3/2000 |
| JP | 2002-107177 | 4/2002 |
| JP | 3704462 B | 10/2005 |

*Primary Examiner* — Tri T Ton
(74) *Attorney, Agent, or Firm* — Rankin, Hill & Clark LLP

(57) ABSTRACT

A batteryless absolute encoder determines the accuracy of absolute position information to be output when electric power is turned on and outputs an alarm signal in the case of abnormality. The batteryless absolute encoder includes an absolute position computing section, an absolute position storing section, and a determining section. The absolute position computing section computes the absolute position of a spindle to be detected, including the number of revolutions of the spindle, based upon detection signals output from four reluctance resolvers. The absolute position storing section stores the absolute position output from the absolute position computing section when electric power is turned off. The determining section compares an absolute position output from the absolute position computing section when electric power is turned on and the stored absolute position and outputs an alarm signal if a difference between the two absolute positions is larger than a predetermined value.

6 Claims, 2 Drawing Sheets

BATTERLESS ABSOLUTE ENCODER

TECHNICAL FIELD

The present invention relates to a batteryless absolute encoder for detecting the absolute position of a spindle to be detected.

BACKGROUND ART

In the related art, there is known a batteryless absolute encoder including a plurality of absolute position detectors connected to a plurality of driven rotary shafts coupled to a main spindle via a gear mechanism to detect the respective rotational angles of the driven rotary shafts in order to detect the absolute position of the main spindle. For example, Japanese Unexamined Patent Application Publication No. 61-4918 (JP61-4918A) discloses a batteryless absolute encoder for detecting the absolute position of a spindle over a large number of revolutions using three resolvers coupled through a gear mechanism.

Japanese Patent No. 3704462 (JP3704462) discloses a batteryless absolute encoder for detecting the absolute position, including the number of turns, of a spindle on the basis of the positional relationship between four reluctance resolvers coupled through a gear mechanism. In such an encoder according to the related art, a combination of gears are chosen to increase the detectable range in order to cover a range of portions of a revolution that are necessary for external output. The number of revolutions can be efficiently calculated by an arrangement in which the respective numbers of teeth of adjacent gears are prime numbers with respect to each other. One of the resolvers is used to both determine which portion of a revolution the spindle is at and determine the number of revolutions of the spindle. The plurality of gears are disposed in two planes, and are disposed on the inner circumferential surface of one of the resolvers with a large diameter in order to achieve a flat configuration.

DISCLOSURE OF INVENTION

Technical Problem

The batteryless absolute encoder holds absolute position information on the absolute position of the spindle to be detected using the positional relationship between the plurality of gears forming the gear mechanism, even if electric power is turned off. Therefore, the batteryless absolute encoder does not inherently need a battery to hold the absolute position information. If an external force is applied to the spindle of the batteryless absolute encoder for some reason to move the spindle after electric power is turned off, the gear mechanism is also moved. When electric power is turned on after that, the batteryless absolute encoder outputs absolute position information obtained after the gear mechanism is moved by the external force. In this event, if wire breakage, malfunction, mechanical damage, or the like should occur in the absolute position detectors (for example, resolvers) so that a correct detection signal cannot be obtained, an erroneous absolute position may be calculated to result in unexpected operation of an apparatus equipped with the encoder. In the related art, however, it is not possible to automatically detect such abnormality.

Even if the calculated absolute position is correct, it is not possible to detect any movement of the spindle beyond a predetermined range due to an external force applied during maintenance work or the like, for example. This may also lead to unexpected operation of the apparatus.

Further, in order to increase the range of the absolute position detectable using a combination of gears, it is necessary to increase the respective numbers of teeth of the gears, which accordingly reduces the allowable error of the absolute position detectors (for example, resolvers) used. Therefore, the production cost may be increased for the configuration according to the related art in order to secure the precision of the absolute position detectors (for example, resolvers). In the configuration disclosed in JP3704462 mentioned above, in particular, an absolute position detector (resolver) RS1 in a first stage is used to both determine which portion of a revolution the spindle is at and determine the number of revolutions of the spindle, and therefore requires a significant precision.

Also, the configuration disclosed in JP3704462, in which gears are enclosed in a resolver with a large diameter, is difficult to manufacture when the size of the encoder is small. In addition, when the gear mechanism is applied to an encoder with a small diameter, the resolver detecting portions and the gear mechanism are stacked vertically, which makes it difficult to reduce the size of the encoder in the axial direction.

An object of the present invention is to provide a batteryless absolute: encoder that can determine the accuracy of absolute position information to be output from the batteryless absolute encoder when electric power is turned on and that can output an alarm signal if the accuracy is not so high.

Solution to Problem

The present invention aims at improvements of a batteryless absolute encoder for detecting the absolute position of a spindle to be detected. The batteryless absolute encoder includes a plurality of rotary absolute position detectors each having a rotary shaft and coupled to each other via a gear mechanism. As the rotary absolute position detectors for use in the present invention, reluctance resolvers or optical absolute position detectors may be used. The batteryless absolute encoder according to the present invention includes an absolute position computing section, an absolute position storing section, and a determining section. The absolute position computing section computes the absolute position of the spindle, including the number of revolutions of the spindle, on the basis of a plurality of detection signals output from the plurality of rotary absolute position detectors. The absolute position storing section includes a non-volatile memory for storing an absolute position output from the absolute position computing section when electric power is turned off. Writing into the non-volatile memory is performed using only an electric charge accumulated in a capacitor provided on a circuit substrate when electric power is turned off. Therefore, the non-volatile memory desirably has as fast a writing speed as possible. The use of the non-volatile memory with a fast writing speed may eliminate the need of a capacitor with a large capacity for securing an electric charge necessary for writing. The determining section compares an absolute position output from the absolute position computing section when the electric power is turned on and the absolute position stored in the non-volatile memory and outputs an alarm signal if a difference between the two absolute positions is larger than a predetermined value. That is, the determining section determines the accuracy of absolute posit ion information to be output from the batteryless absolute encoder when electric power is turned on, and outputs an alarm signal if the accuracy is low. Post-processing using the output alarm signal is, for example, to issue a warning from a warning unit, to stop outputting the absolute position from the absolute position computing section in response to the alarm signal, or to prohibit activation of an apparatus equipped with the encoder in response to the alarm signal.

According to the present invention, the determining section outputs an alarm signal if the absolute position output as electric power is turned on differs from the absolute position output before electric power has been turned off because the spindle is moved out of a predetermined range by an external force after electric power has been turned off or a failure occurs in the absolute position detectors. Consequently, the apparatus equipped with the encoder may be prevented from acting unexpectedly by issuing a warning or prohibiting activation of the apparatus in response to the alarm signal.

The absolute position storing section may be provided with a counter section for storing the number of times that an upper limit for a detection range of the absolute position is exceeded, where the upper limit is defined based on a combination of respective numbers of teeth of gears included in the gear mechanism. The counter section may preferably include a non-volatile memory for storing information on the number of times mentioned above. When the absolute position storing section is provided with such a counter section, the absolute position computing section may be configured to compute a current absolute position on the basis of the number of times that the upper limit for toe detection range of the absolute position is exceeded and the absolute position computed on the basis of the plurality of detection signals. With this configuration, the absolute position computation is not constrained by the upper limit for the detection range of the absolute position although the detection range of the absolute position is defined based on a combination of respective numbers of teeth of gears included in the gear mechanism. The detection range of the absolute position may not be limited even if the detection range defined by the gear mechanism is narrow.

When the plurality of gears forming the gear mechanism are disposed in the same plane, both of the gear mechanism and the encoder may readily be configured in a smaller size. In addition, the dimension of the encoder in the axial direction of the spindle may be reduced.

One of the rotary absolute position detectors, whose rotary shaft is connected to the spindle, is disposed on one side of the gear mechanism. One of the gears included in the gear mechanism is fixed to the rotary shaft of the one rotary absolute position detector. Further, the remaining rotary absolute position detectors are disposed on the other side of the gear mechanism. The gears respectively fixed to the rotary shafts of the remaining rotary absolute position detectors are disposed around the one gear. With this configuration, the size of the encoder may be reduced.

In particular, the batteryless absolute encoder, whose detection range of an absolute position is not limited, may include at least an absolute position computing section and an absolute position storing section including a counter section.

BEST MODE FOR CARRYING OUT THE INVENTION

Figure 1:
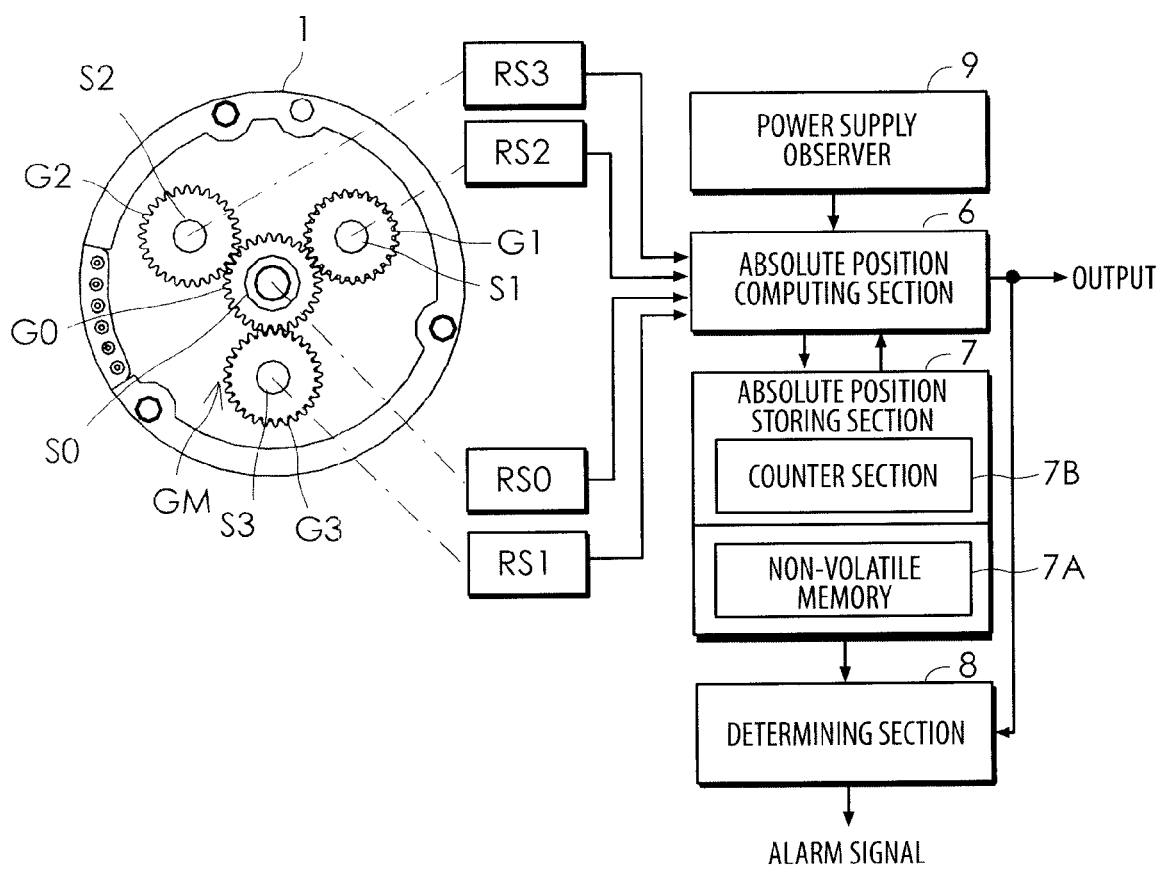
FIG. 1 schematically shows a configuration of a batteryless absolute encoder according to an embodiment of the present invention.
Figure 2:
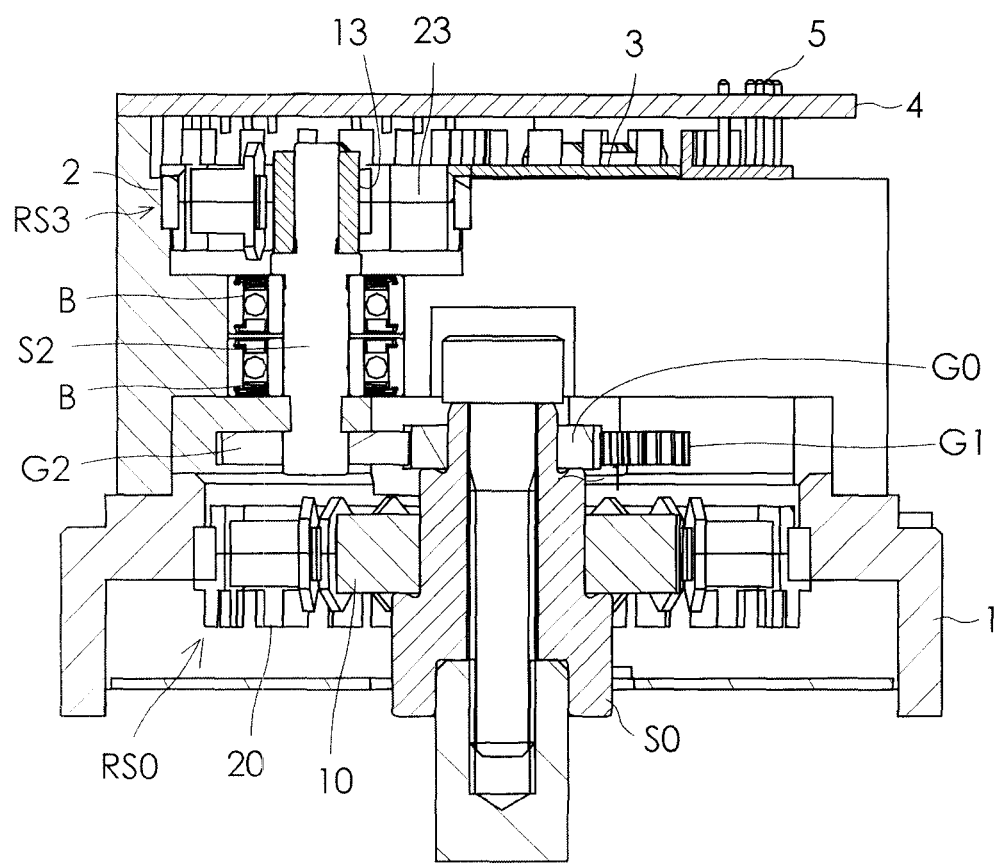
FIG. 2 is a partial cross-sectional view of the batteryless absolute encoder according to the embodiment.

A batteryless absolute encoder according to an embodiment of the present invention will be described in detail below with reference to the drawings. FIG. 1 schematically shows a configuration of the batteryless absolute encoder according to the embodiment of the present invention, including a view showing the configuration of a gear mechanism GM and a block diagram showing elements that are necessary for computation. FIG. 2 is a partial cross-sectional view of the batteryless absolute encoder according to the embodiment.

As shown in FIG. 1, the batteryless absolute encoder according to the embodiment includes four reluctance resolvers RS0 to RS3, used as rotary absolute position detectors, each having a rotary shaft S0 to S3 and coupled to each other via the gear mechanism GM. The rotary shaft S0 is connected to an output shaft (a spindle to be detected) of a motor (not shown), for example. In FIG. 2, only two reluctance resolvers RS0 and RS2 are shown. In FIG. 1, the four reluctance resolvers RS0 to RS3 are shown in the block diagram. The gear mechanism GM, which couples the four rotary shafts S0 to S3 to each other, is configured such that spur gears G0 to G3 respectively coupled to the four rotary shafts S0 to S3 mesh with each other to rotate in the same plane. In the embodiment, the number of teeth of the gear G0 is equal to the number of teeth of the gear G1 so that the reluctance resolver RS1 is used to determine which portion of a revolution the spindle is at. Two gears, namely the gear G2 for the reluctance resolver RS2 and the gear G3 for the reluctance resolver RS3, are used to determine the number of revolutions of the spindle. Specifically, the gears G0 and G1 each have 28 teeth, the gear G2 has 27 teeth, and the gear G3 has 29 teeth.

In FIGS. 1 and 2, reference numeral 1 denotes a gearbox housing the gear mechanism GM and a rotor portion 10 and a stator portion 20 of the reluctance resolver RS0. As shown in FIG. 2, a casing body 2 housing bearings B for rotatably supporting the rotary shafts S1 to S3 of the three reluctance resolvers RS1 to RS3 as well as rotor portions 13 and stator portions 23 of the three reluctance resolvers RS1 to RS3 is fixed on top of the gearbox 1. The casing body 2 also houses a circuit substrate 3 provided opposite the gearbox 1. A computing circuit shown in FIG. 1 is mounted on the circuit substrate 3. A plurality of terminals 5 extending from the circuit substrate 3 extend from an end plate 4 of the casing body 2 to the outside.

As shown in FIG. 2, in the embodiment, the reluctance resolver RS0 having the rotary shaft S0 connected to the spindle is disposed on one side of the gear mechanism GM. The remaining three reluctance resolvers RS1 to RS3 are disposed on the other side of the gear mechanism GM. The gears G1 to G3 are disposed around the gear G0 located at the center, thereby reducing the overall size of the encoder.

As shown in FIG. 1, the computing circuit mounted on the circuit substrate 3 includes an absolute position computing section 6, an absolute position storing section 7, a determining section 8, and a power supply observer 9. The absolute position computing section 6 computes the absolute position of the rotary shaft S0 connected to the spindle, including the number of revolutions of the rotary shaft S0, on the basis of a plurality of detection signals respectively output from the four reluctance resolvers RS0 to RS3. The basic idea of computing the absolute position is described in detail in JP3704462 and is not described herein.

The absolute position storing section 7 includes a non-volatile memory 7A therein, serving as a storage element, for storing an absolute position output from the absolute position computing section 6 when electric power is turned off. Writing into the non-volatile memory 7A is performed using only an electric charge accumulated in a capacitor provided on the circuit substrate 3 when electric power is turned off. Therefore, the non-volatile memory 7A may desirably have as fast a writing speed as possible. The use of the non-volatile memory 7A with a fast writing speed may eliminate the need of a capacitor with a large capacity for securing an electric charge necessary for writing. Thus, specific examples of the non-volatile memory 7A include a non-volatile memory, such as available from Ramtron International Corporation, that operates at a high speed with an access speed per writing of 30 ns or less and that can be rewritten an unlimited number of times. The writing operation into the non-volatile memory 7A will be specifically described below. A power source voltage of 5 V is supplied to the circuit on the circuit substrate 3, and the writing into the non-volatile memory 7A is performed at 3.3 V. The power supply observer 9 includes a power monitoring element for detecting whether the 5-V power source voltage is turned off. In the embodiment, the power supply observer 9 determines that electric power is turned off if the power source voltage drops to 4.2 V, and a writing circuit (not shown) included in the absolute position storing section 7 initiates a writing operation. In the embodiment, the writing into the non-volatile memory 7A is performed using only electric charge accumulated in a tantalum capacitor and a ceramic capacitor provided on the circuit substrate 3 in order to stabilize the power source line. It has been experimentally demonstrated that it takes 3 ms or more for the power source voltage to drop from 4.2 V to 3.3 V in the embodiment. Meanwhile, assuming that it is necessary to write information equivalent to eight words into the non-volatile memory 7A, writing of all the data takes 40 µs is or less. Thus, a sufficient margin for writing is secured. The use of such a non-volatile memory capable of high-speed writing enables stabilized writing into the non-volatile memory without the need of an aluminum electrolytic capacitor with a large capacity or the like.

The determining section 8 compares an absolute position output from the absolute position computing section 6 when the power supply observer 9 detects that electric power for the encoder is turned on and the absolute position stored in the non-volatile memory 7A in the absolute position storing section 7 when the power is turned off, and outputs an alarm signal when a difference between the two absolute positions is larger than a predetermined value. This is because a difference occurs between the absolute position stored in the non-volatile memory 7A as the power is turned off and the current absolute position if the spindle is rotated by an external force. If the difference between the current absolute position defined based on the relationship between detection signals output from the four resolvers RS0 to RS3 coupled to each other via the gear mechanism GM and the previous absolute position stored in the non-volatile memory 7A falls within a predetermined allowable range when the power supply observer 9 detects that electric power is turned on, the absolute position defined based on the detection signals from the four resolvers RS0 to RS3 is adopted. If the difference between the two absolute positions exceeds the predetermined allowable difference for the number of revolutions, the determining section 8 determines that the motor has been rotated by an external force to a portion to which the motor would normally not be rotated when electric power is turned off or that a failure has occurred in any of the four resolvers RS0 to RS3 to generate an alarm. The allowable difference for the number of revolutions for generating an alarm depends upon apparatuses equipped with the encoder. Therefore the difference may be appropriately set for each apparatus equipped with the encoder.

Post-processing using the alarm signal output from the encoder is, for example, to issue a warning from a warning unit, to stop outputting the absolute position from the absolute position computing section 6 in response to the alarm signal, or to prohibit activation of the apparatus equipped with the encoder in response to the alarm signal.

According to the embodiment, the determining section 8 outputs an alarm signal if the absolute position output as electric power is turned on differs from the absolute position output before electric power has been turned off because the spindle is moved by an external force while electric power is turned off or a failure occurs in the reluctance resolvers. Thus, the apparatus equipped with the encoder may be prevented from acting unexpectedly by taking proper measures on the basis of the alarm signal.

In the embodiment, the absolute position storing section 7 includes a counter section 7B for storing the number of times that the upper limit for the detection range of the absolute position is exceeded, where the upper limit is defined based on the combination of the respective numbers of teeth of the gears included in the gear mechanism GM. The counter section 7B includes a non-volatile memory for storing information on the number of times mentioned above. In the embodiment, the non-volatile memory 7A mentioned above is utilized as the non-volatile memory for use in the counter section 7B. The absolute position computing section 6 according to the embodiment computes the current absolute position on the basis of the number of times that the upper limit for the detection range of the absolute position is exceeded by the computed absolute position and the absolute position computed on the basis of the detection signals from the four resolvers RS0 to RS3. With this configuration, the absolute position computation is not constrained by the upper limit for the detection range of the absolute position although the detection range of the absolute position is defined based on a combination of respective numbers of teeth of gears included in the gear mechanism. The detection range of the absolute position may not be limited even if the detection range defined by the gear mechanism GM is narrow.

In the embodiment, the four gears forming the gear mechanism GM are disposed in the same plane. For application of the present invention, however, the structure of the gear mechanism and the number of resolvers used may be determined as desired. It is a matter of course that the arrangement of the plurality of resolvers is not limited to the one according to the embodiment, and any arrangement may be adopted.

In the embodiment, the absolute position storing section 7 is provided with the counter section 7B for storing the number of times that the upper limit for the detection range of the absolute position is exceeded, where the upper limit is defined based on the combination of the respective numbers of teeth of the gears included in the gear mechanism GM. If the detection range of the absolute position is limited, however, the counter section 7B may not necessarily be provided.

Further, in the embodiment, reluctance resolvers are used as the rotary absolute position detectors. However, it is a matter of course that optical absolute position detectors may be used instead.

INDUSTRIAL APPLICABILITY

According to the present invention, the determining section outputs an alarm signal if the absolute position output as electric power is turned on differs from the absolute position output before electric power has been turned off because the spindle to be detected is moved out of a predetermined range by an external force after electric power has been turned off or a failure occurs in the absolute position detectors. Thus, it is possible to determine the accuracy of absolute position information output from the batteryless absolute encoder when electric power is turned on. In addition, unexpected operation of the apparatus equipped with the encoder may be prevented by issuing a warning or prohibiting activation of the apparatus on the basis of the alarm signal.

The invention claimed is:

1. A batteryless absolute encoder for detecting an absolute position of a spindle to be detected, the batteryless absolute encoder comprising:

a plurality of rotary absolute position detectors each having a rotary shaft and coupled to each other via a gear mechanism;

an absolute position computing section for computing the absolute position of the spindle, including the number of revolutions of the spindle, on the basis of a plurality of detection signals output from the plurality of rotary absolute position detectors;

an absolute position storing section provided with a non-volatile memory for storing an absolute position output from the absolute position computing section when electric power is turned off; and a determining section for comparing the absolute position output from the absolute position computing section when the electric power is turned on and the absolute position stored in the non-volatile memory and outputting an alarm signal if a difference between the two absolute positions is larger than a predetermined value, wherein:

the absolute position storing section includes a counter section for storing the number of times that an upper limit for a detection range of the absolute position is exceeded, the upper limit being defined based on a combination of respective numbers of teeth of gears included in the gear mechanism, and the absolute position computing section computes a current absolute position of the spindle on the basis of the number of times that the upper limit for the detection range of the absolute position is exceeded, which is stored in the counter section, and the absolute position computed on the basis of the plurality of detection signals.

2. The batteryless absolute encoder according to claim 1, wherein the plurality of gears forming the gear mechanism are disposed in the same plane.

3. The batteryless absolute encoder according to claim 2, wherein:

one of the rotary absolute position detectors, whose rotary shaft is connected to the spindle, is disposed on one side of the gear mechanism;

one of the gears included in the gear mechanism is fixed to the rotary shaft of the one rotary absolute position detector;

the remaining rotary absolute position detectors are disposed on the other side of the gear mechanism; and the gears respectively fixed to the rotary shafts of the remaining rotary absolute position detectors are disposed around the one gear.

4. The batteryless absolute encoder according to claim 1, wherein the rotary absolute position detectors are each a reluctance resolver.

5. The batteryless absolute encoder according to claim 1, wherein the rotary absolute position detectors are each an optical absolute position detector.

6. The batteryless absolute encoder according to claim 1, wherein the absolute position computing section stops outputting the absolute position in response to the alarm signal.

* * * * *

UNITED STATES PATENT AND TRADEMARK OFFICE
CERTIFICATE OF CORRECTION

PATENT NO. : 8,526,013 B2  Page 1 of 1
APPLICATION NO. : 12/934456
DATED : September 3, 2013
INVENTOR(S) : Makiuchi et al.

It is certified that error appears in the above-identified patent and that said Letters Patent is hereby corrected as shown below:

Title Page, Item (54) and in the Specification, Column 1, Line 1, Title, Delete "BATTERLESS ABSOLUTE ENCODER" insert --BATTERYLESS ABSOLUTE ENCODER--

Signed and Sealed this
Nineteenth Day of November, 2013

Teresa Stanek Rea
*Deputy Director of the United States Patent and Trademark Office*